United States Patent
Vance et al.

(10) Patent No.: US 9,277,833 B1
(45) Date of Patent: Mar. 8, 2016

(54) MULTI-DESTINATION CHECKOUT SYSTEM AND RELATED METHODS

(71) Applicant: PAN OSTON HOLDING COMPANY, Bowling Green, KY (US)

(72) Inventors: James R. Vance, Scottsville, KY (US); Chad A. Eilers, Bowling Green, KY (US); Richard J. Blankenship, Bowling Green, KY (US); Gordon T. Gravelle, Glasgow, KY (US); Andrew B. Ritter, Bowling Green, KY (US); Jerrod P. Arterburn, Glasgow, KY (US); Kyle Thomas Hampton, Rockfield, KY (US)

(73) Assignee: PAN OSTON HOLDING COMPANY, Bowling Green, KY (US)

( * ) Notice: Subject to any disclaimer, the term of this patent is extended or adjusted under 35 U.S.C. 154(b) by 0 days.

(21) Appl. No.: 14/617,153

(22) Filed: Feb. 9, 2015

Related U.S. Application Data

(60) Provisional application No. 61/937,364, filed on Feb. 7, 2014, provisional application No. 62/060,129, filed on Oct. 6, 2014.

(51) Int. Cl.
*A47F 10/02* (2006.01)
*A47F 9/04* (2006.01)
*B65G 43/10* (2006.01)

(52) U.S. Cl.
CPC . *A47F 9/04* (2013.01); *A47F 9/046* (2013.01); *A47F 2009/041* (2013.01); *B65G 43/10* (2013.01)

(58) Field of Classification Search
CPC ..... A47F 9/04; A47F 2009/041; B65G 15/26; B65G 17/28; B65G 43/10
USPC ............ 186/59, 60, 66, 68, 69; 198/340, 348, 198/349, 369.2, 369.7, 575
See application file for complete search history.

(56) References Cited

U.S. PATENT DOCUMENTS

| | | | |
|---|---|---|---|
| 2,830,693 A | 4/1958 | Schlossmacher | |
| 3,605,982 A | 9/1971 | Adler | |
| 3,688,873 A * | 9/1972 | Potrafke et al. | 186/68 |
| 3,917,050 A | 11/1975 | Gregor | |
| 4,166,525 A | 9/1979 | Bruno | |
| 4,593,806 A | 6/1986 | Tappe | |
| 5,154,260 A | 10/1992 | Patel | |
| 5,715,930 A | 2/1998 | Hogenkamp | |
| 5,755,308 A * | 5/1998 | Lindstrom et al. | 186/66 |
| 5,796,052 A | 8/1998 | Christmann | |
| 5,984,078 A | 11/1999 | Bonnet | |
| 6,035,971 A | 3/2000 | Lindstrom et al. | |
| 6,213,395 B1 | 4/2001 | Dejaeger et al. | |
| 6,394,345 B1 | 5/2002 | Dejaeger et al. | |

(Continued)

FOREIGN PATENT DOCUMENTS

WO 2013116801 8/2013

*Primary Examiner* — Mark Beauchaine
(74) *Attorney, Agent, or Firm* — King & Schickli, PLLC

(57) ABSTRACT

A checkout stand includes a first extendable conveyor extending in a first direction for delivering one or more articles to a first bagging station. A second conveyor is provided for conveying one or more articles from the first conveyor to at least a second bagging station. A scanner may be provided for scanning the articles, such as during delivery by an infeed conveyor upstream of the first conveyor. A controller may control the first conveyor to selectively divert articles between the first and second bagging stations. Related methods are also disclosed.

34 Claims, 9 Drawing Sheets

(56) References Cited

U.S. PATENT DOCUMENTS

| | | |
|---|---|---|
| 6,668,979 B2 | 12/2003 | McQuaid et al. |
| 7,121,398 B2 | 10/2006 | Affaticati et al. |
| 7,168,555 B2 | 1/2007 | Peterson |
| 7,386,472 B1 | 6/2008 | Bogat |
| 7,395,918 B2 | 7/2008 | Thompson |
| 7,490,712 B2 | 2/2009 | Hamers et al. |
| 7,562,760 B2 | 7/2009 | Affaticati et al. |
| RE41,717 E | 9/2010 | Dejaeger |
| 7,967,112 B2 * | 6/2011 | Kaplan et al. .................. 186/59 |
| 8,479,912 B2 | 7/2013 | Layne |
| 8,783,438 B2 | 7/2014 | Phan et al. |
| 2013/0062159 A1 | 3/2013 | Fischer |
| 2013/0146419 A1 | 6/2013 | Layne |

* cited by examiner

MULTI-DESTINATION CHECKOUT SYSTEM AND RELATED METHODS

This application claims the benefit of U.S. Provisional Patent Application Ser. Nos. 61/937,364 and 62/060,129, the disclosures of which are incorporated herein by reference.

TECHNICAL FIELD

This disclosure relates to the art of systems for facilitating the sale of articles to customers in a store environment and, in particular, to a checkout system including a conveyor for conveying articles to multiple destinations.

BACKGROUND

Retail stores, and especially those selling groceries, are looking for manners in which to increase the efficiency of the checkout process while reducing costs. This has led to the use of self-checkout lanes, but the same inefficiency results, since only one consumer can use each lane at a given time. There is also the problem of delicate purchased articles (eggs, loaves of bread, flowers, etc.) being damaged during conveyance for bagging, or then as a result of being bagged incorrectly. Accordingly, the need for a more efficient solution for checking articles for purchase out of a store is identified.

SUMMARY

In one aspect, a checkout system for articles offered for sale at a store and for facilitating the bagging of the articles for removal from the store by a customer is provided. The system comprises first and second stations adapted for supporting the articles for bagging. A first conveyor is provided for delivering articles to the first bagging station, the first conveyor having a retracted condition and an extended condition for delivering the articles to the first bagging station. A second conveyor is also provided for conveying articles from the first conveyor in the retracted condition to the second bagging station. A scanner for scanning the articles is providing, such as along an infeed conveyor upstream of the first conveyor. A controller is provided for controlling the first conveyor to move between the retracted condition and the extended condition in order to deliver articles between the first and second bagging stations.

In one embodiment, the second conveyor is below an extended portion of the first conveyor in the extended condition, and may be adapted to deliver articles in a first direction to the second bagging station or in a second direction to a third bagging station. The controller may be adapted to cause the first conveyor to deliver a first group or series of scanned articles to the first bagging station and a second group or series of scanned articles to the second bagging station. The controller may be further adapted to cause the first conveyor to deliver a third series or group of scanned articles to a third bagging station. A bag receptacle or display may be associated with each bagging station, and the system may further include a payment station. One of the first or second conveyors may be adapted for being raised and lowered to transfer the articles from one of the first or second conveyors to the other in a smooth, uninterrupted manner.

Another aspect of the disclosure pertains to a method of checking out of a store at a checkout location. The method comprises delivering at least one first article selected for purchase at the checkout location on a first conveyor in an extended condition to a first bagging station, and delivering at least one second article selected for purchase at the checkout location from the first conveyor to a second bagging station using a second conveyor, with the first conveyor in a retracted condition. The method may further include the step of delivering at least one third article to a third bagging station using the second conveyor.

The delivering step may comprise delivering a first group of articles to the first bagging station, and delivering a second group of articles to the second bagging station (and the step of delivering the first group may be completed before the step of delivering the second group). The delivering step may comprise delivering a first article from the first group, then a first article from the second group, then a second article from the first group. The delivering step may comprise delivering a first series of articles placed on the first conveyor during a first time period to the first bagging station, and delivering a second series of articles placed on the first conveyor during a second time period to the second bagging station.

The method may further include the step of placing the articles into one or more receptacles at the first bagging station and the second bagging station. The method may also include transacting with one or more customers to purchase the first group of articles, the second group of articles or both the first and second groups of articles.

Another aspect of the disclosure pertains to a checkout system for articles at a store. The system comprises a first extendable conveyor having a retracted condition and an extended condition for conveying articles to a first area, and a second conveyor for conveying articles from the first extendable conveyor in the retracted condition to at least a second area.

A payment station is provided for receiving payment for at least some of the articles. The payment station may be at the first area or the second area, and a bagging station may be provided at each of the first and second areas. A second payment station may be provided at the other of the first area or the second area. The payment station may be located upstream of the first conveyor.

A further aspect of the disclosure relates to method for facilitating the checking out of a store by a customer. The method comprises conveying a first group or series of articles on a first transpositor conveyor to a first area and conveying a second group or series of articles from the first conveyor to a second area using a second conveyor. The method further includes providing a device for the purchase of at least some of the articles by the customer adjacent to the first or second area.

Still a further aspect of the disclosure relates to a checkout system comprising a first conveyor for delivering articles on a first conveying surface to a first bagging station, the first conveyor having an extended condition for delivering the articles to the first bagging station and a retracted condition. A second conveyor is provided for conveying articles from the first conveyor to at least a second bagging station in the retracted condition, the second conveyor having a second conveying surface substantially aligned with the first conveying surface of the first conveyor in the retracted condition. A scanner is provided for scanning the articles, such as prior to being conveyed by the first conveyor. A controller is provided for controlling the first conveyor to selectively divert articles between the first and second bagging stations.

A first end of the first conveyor adjacent to the second conveyor may be adapted for being raised and lowered in the retracted condition. This may be done to substantially align the first and second conveying surfaces. Alternatively or additionally, the second conveyor may be adapted for being raised and lowered.

Yet another aspect of the disclosure pertains to a checkout system for articles at a store. The system comprises a first conveyor extending in a first direction for conveying the articles, a second conveyor extending in a second direction for conveying the articles from the first conveyor to either the first bagging station or a second bagging station, a scanner for scanning the articles, and a controller for controlling the first conveyor to selectively divert one or more of the articles between the first and second bagging stations.

The first conveyor may comprise an extendable bed adapted to extend over the second conveyor and deliver the articles to a third bagging station. The first conveyor has an extended condition and a retracted condition, and the second conveyor includes a second conveying surface substantially aligned with the first conveying surface of the first conveyor in the retracted condition of the first conveyor.

Another aspect of the invention a tiltable conveyor system comprising a first conveyor for conveying articles on a first conveying surface, the first conveyor having an extended condition and a retracted condition, and a second conveyor for conveying articles received from the first conveyor in the retracted condition, the second conveyor having a second conveying surface substantially aligned with a corresponding end of the first conveying surface of the first conveyor in the retracted condition. An actuator is also provided for raising or lowering at least the corresponding end of the first conveyor relative to the second conveyor.

Yet another aspect of the disclosure pertains to a checkout system for articles offered for sale at a store and for facilitating the purchase of the articles by a plurality of customers. The system comprises a scanner for scanning the articles and a divided infeed conveyor adapted for successively conveying at least a first article of a first customer to the scanner and at least a second article of a second customer to the scanner. A first conveyor is provided having an extended condition for conveying the articles for delivery to the first bagging station and a retracted condition.

The system may further include a second conveyor for conveying articles received from the first conveyor in the retracted condition for delivery to the second bagging station. A controller may also be adapted for controlling the first conveyor to move to the retracted condition or the extended condition in order to selectively deliver articles to the first bagging station or the second bagging station. The divided infeed conveyor may comprise a first conveyor for conveying the first article and a second conveyor for conveying the second article.

DETAILED DESCRIPTION

Figure 1:
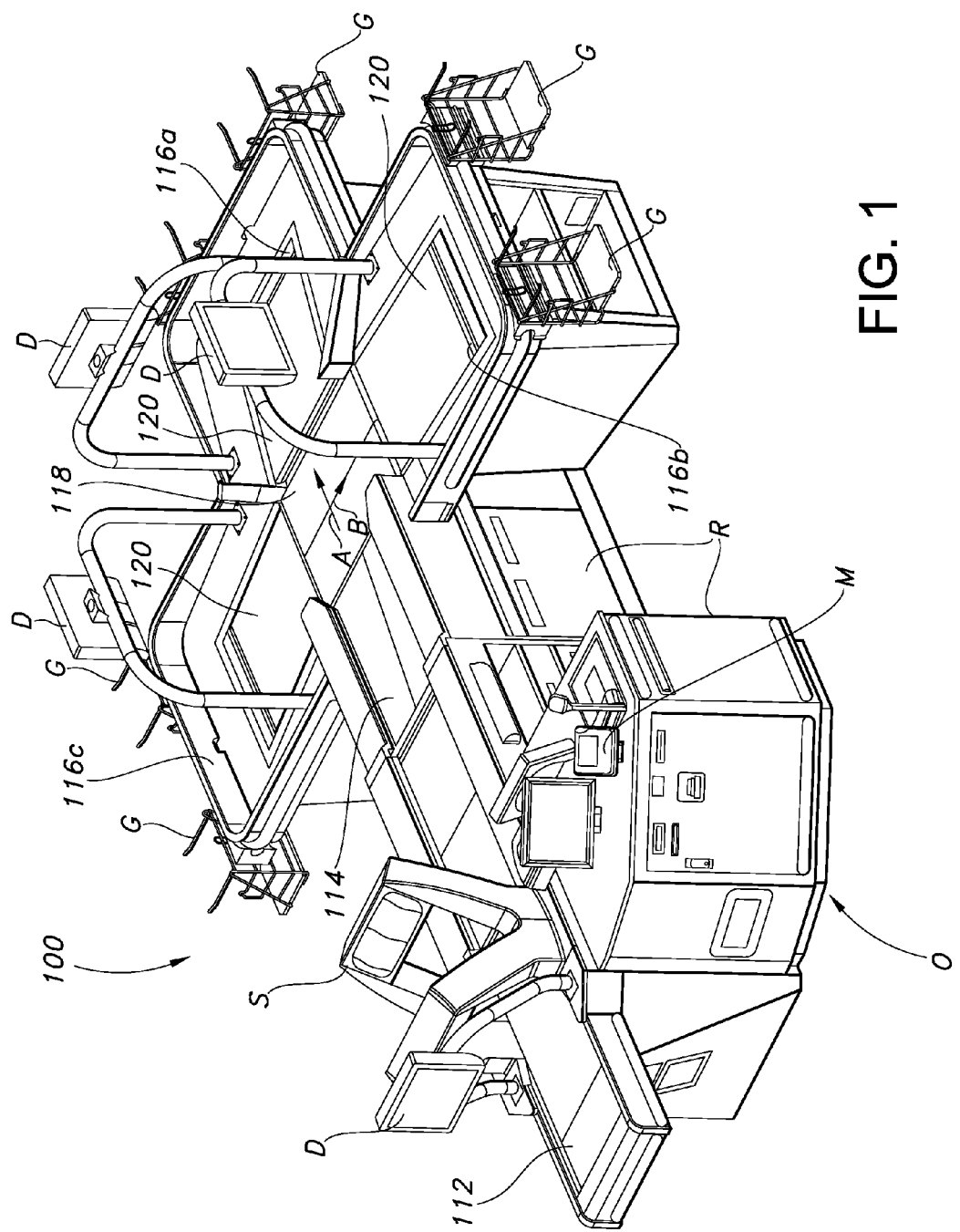
FIGS. 1 and 2 are perspective views of one embodiment of a checkout system according to the disclosure.

With reference to FIG. 1, one possible embodiment of a checkout stand or system 100 is illustrated. The system 100 may be for use in a store (retail, wholesale, stationary, mobile, indoor, outdoor, or otherwise) or other similar location where articles are offered for purchase and then a checkout arrangement is used to sell the articles to one or more customers. The system 100 thus serves to facilitate the identification of the articles selected by a customer for purchase, such as through automated scanning, and then sort the articles among multiple destinations for bagging, while also providing a means for allowing the customer to pay for the articles purchased (either in an automated fashion or manually).

Figure 8:
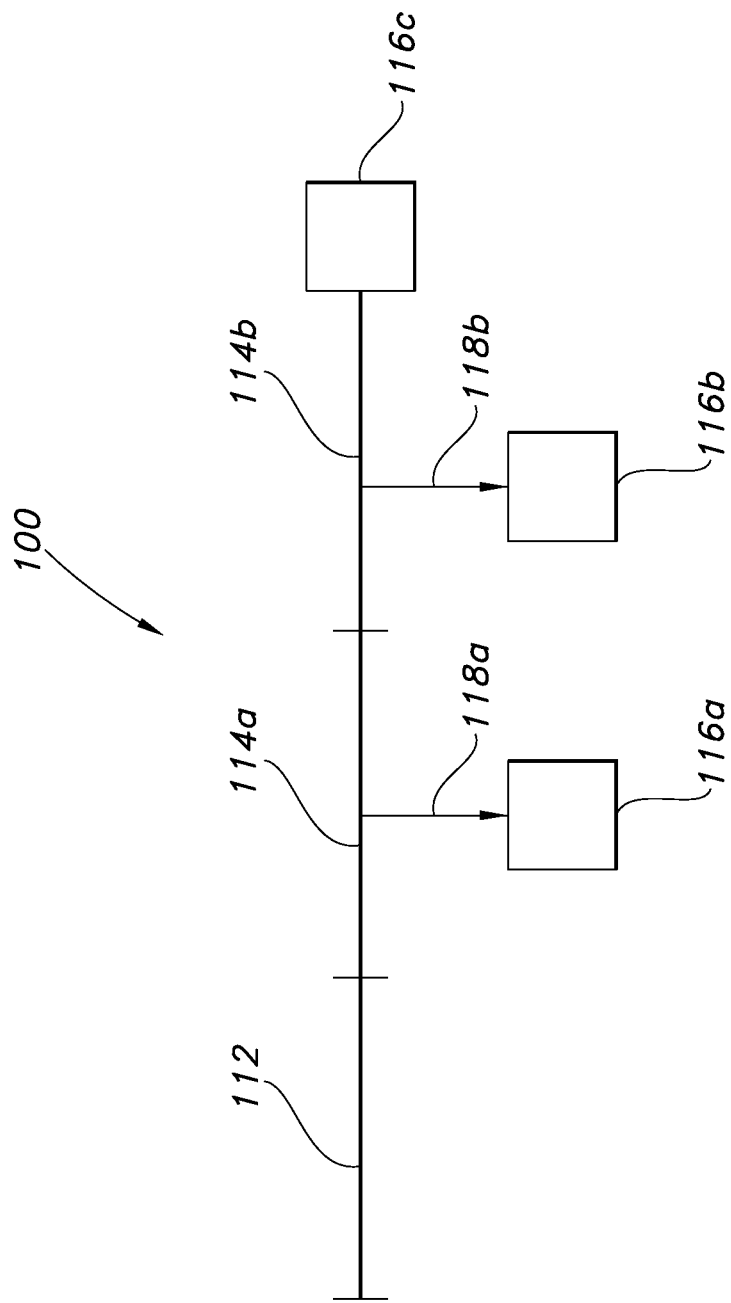
FIG. 8 is a schematic view showing another possible embodiment of the system.

As illustrated, the system 100 may comprise a first conveyor 114 for conveying articles in connection with a second conveyor 118, which in turn provides for the selective delivery of articles to different destinations, such as stations 116a and 116b (or a third destination, such as station 116c, such as if conveyor 114 is of a fixed length and conveyor 118 is bidirectional (that is, it may be actuated to convey articles in opposite directions) to deliver to either the left or right stations 116b, 116c, but see also FIG. 8). The conveyors 114, 118 may comprise endless belt conveyors, each providing a conveying surface for receiving and engaging the articles to be conveyed.

Figure 2:
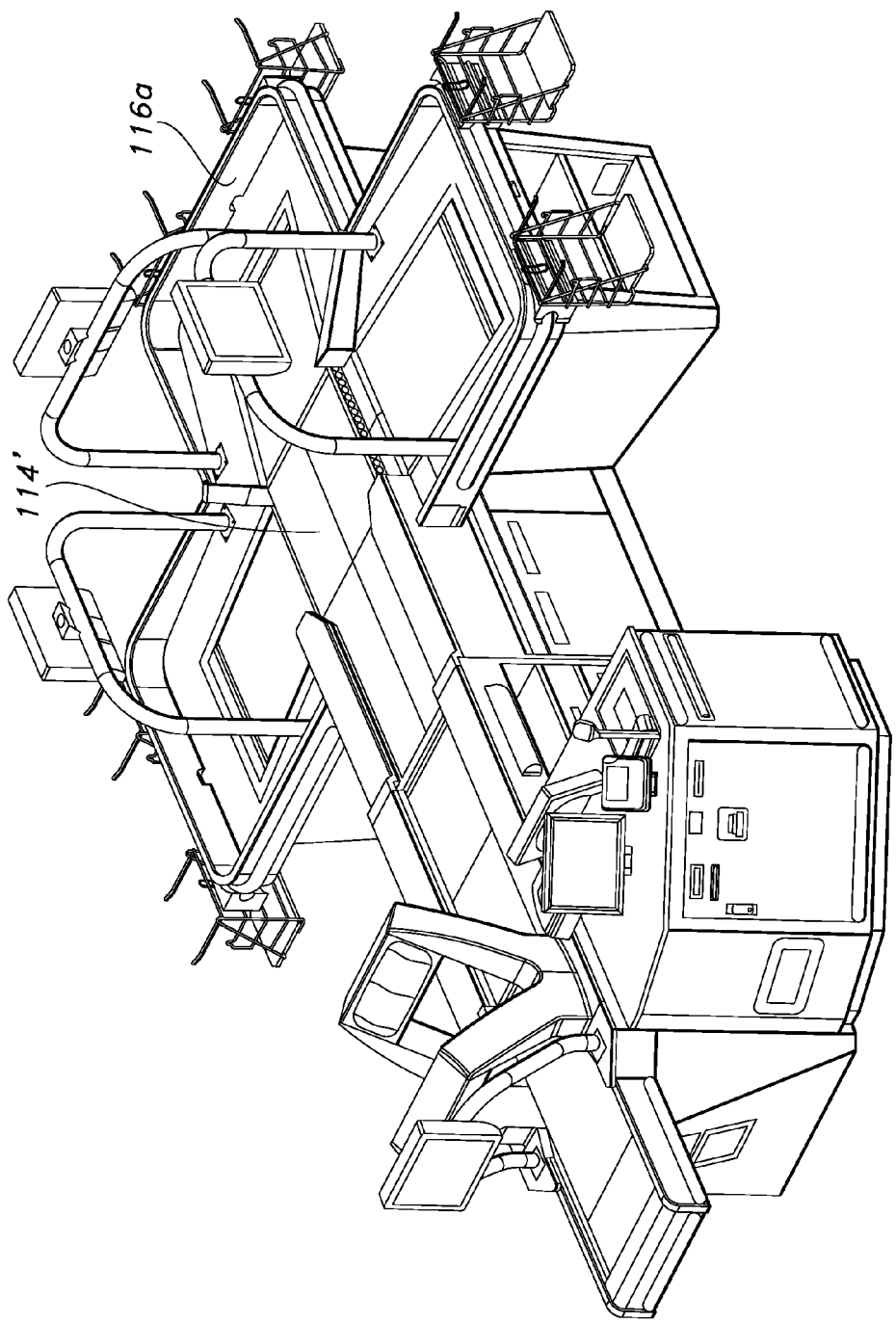
Figure 3:
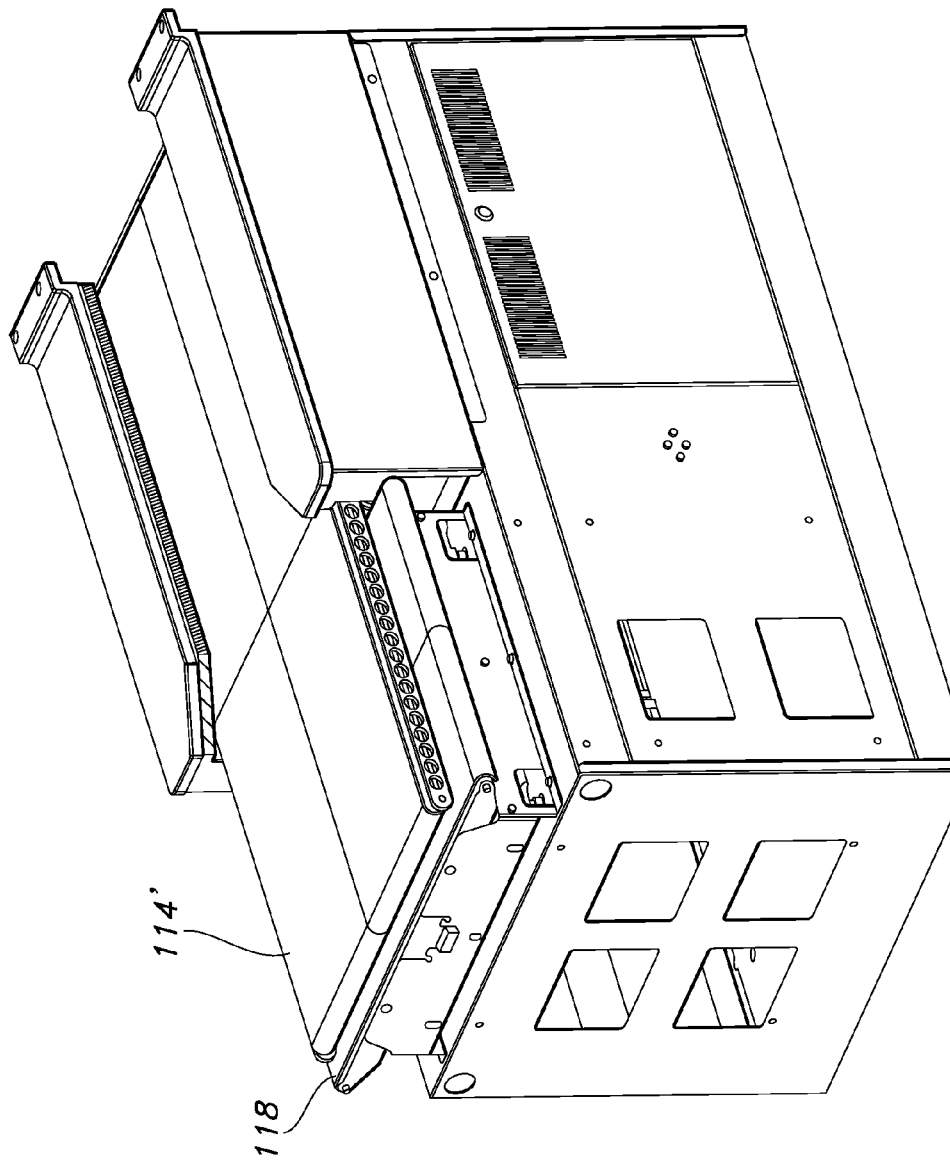
FIGS. 3 and 4 are perspective views of a portion of the system in different operating conditions.
Figure 4:
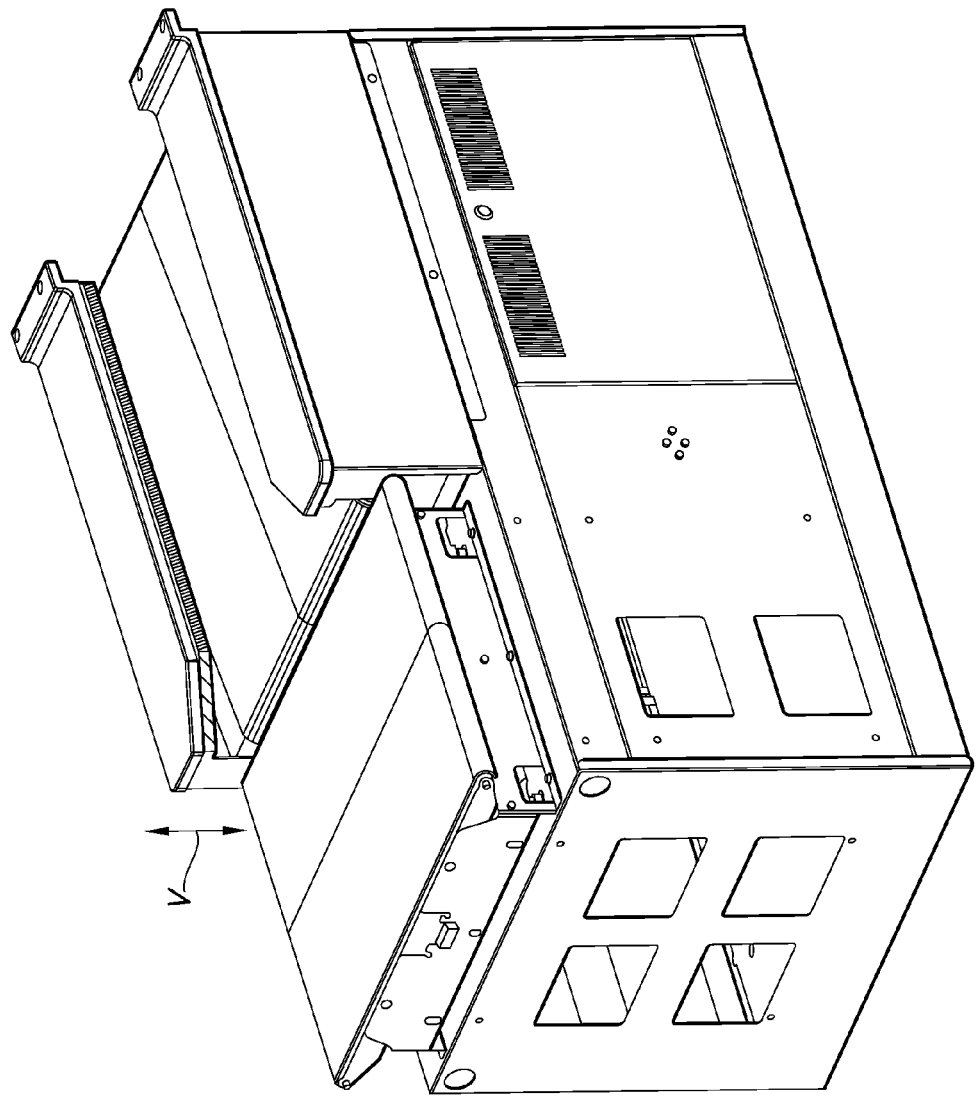
Figure 5:
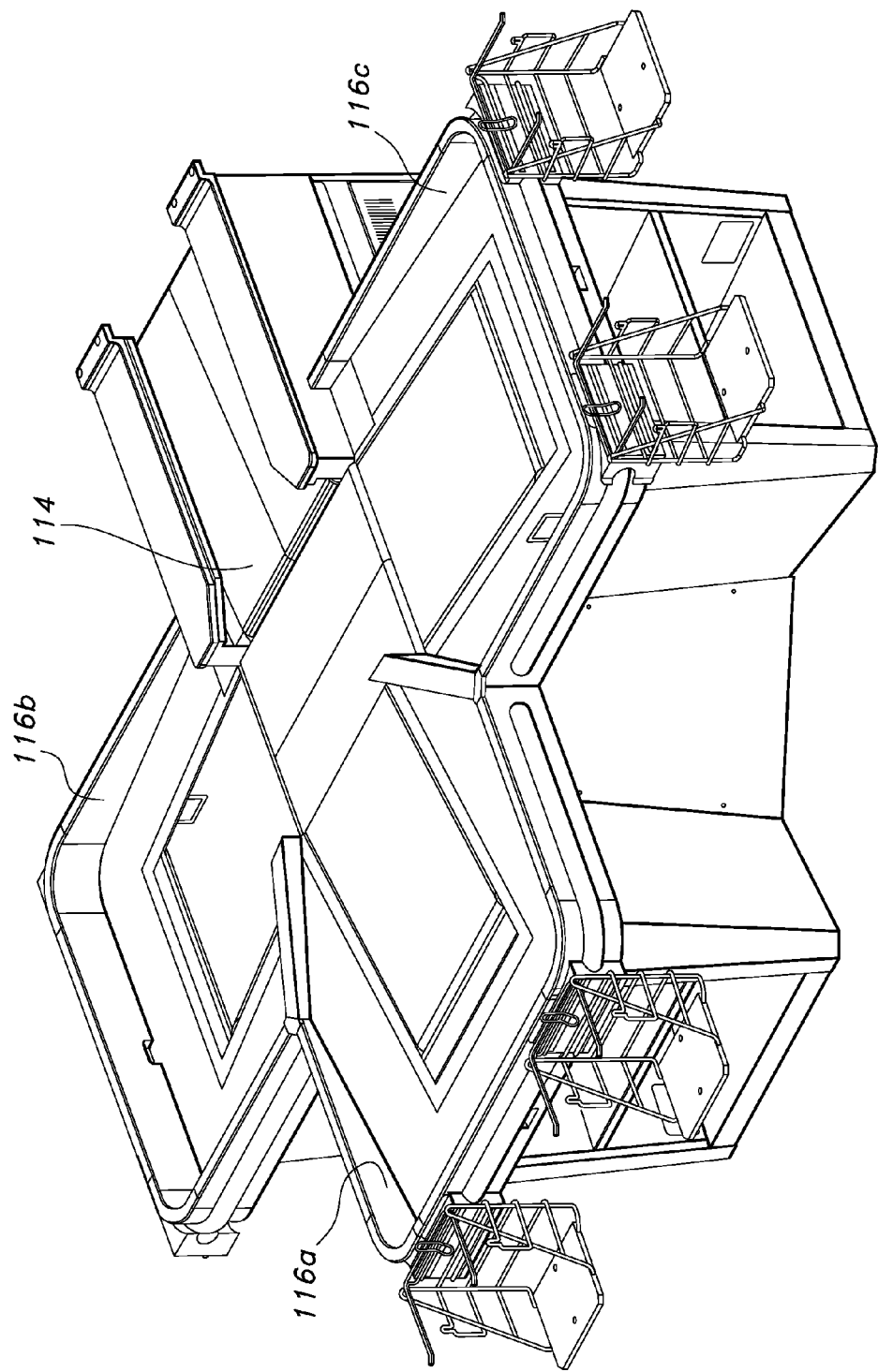
FIGS. 5 and 6 are perspective views of another portion of the system in different operating conditions.

In order to achieve the multi-destination delivery in one embodiment, conveyor 114 may comprise an extendable, or "transpositor" conveyor, which may assume a retracted condition exposing conveyor 118 and an extended condition covering it (such that a portion of the first conveyor 114 overlies the conveyor 118) so as to deliver the article(s) to a downstream location, such as station 116a in the illustrated embodiment (compare conveyor 114 in FIG. 1 with conveyor 114' in FIG. 2 and also FIG. 3). The selection may be based on the upstream scanning of the articles by a scanner 5, which may be manual or automated, and in association with a controller R for controlling the conveyors 114 or 118 so as to effectuate the delivery in the intended manner. An exemplary arrangement of a transpositor conveyor 114 and associated takeaway conveyor 118 may be found in International Patent Application PCT/US13/024531 and U.S. Pat. No. 8,479,912 (the disclosures of which are both incorporated herein by reference). Other forms are also known and may be used.

At the stations 116a, 116b, collection of the articles, such as through bagging, boxing, or the like (collectively, "bagging") may occur. Consummating a transaction for purchasing the articles may also occur at some location associated with the system 100 or adjacent thereto. For example, the transaction may be completed at the operator's station O, or at a different location based on the known cost of the scanned articles (note payment machine M associated with controller R, which may transmit and receive the purchase information using the data obtained from scanner S regarding the articles, and may communicate with a network within or external to the store).

Thus, in one example, the articles associated with a particular customer at the store (and, in particular, at the checkout location) are placed on an infeed conveyor 112, such as from a shopping cart or like carrier used by a customer to carry the articles selected for purchase throughout the store during a shopping event. As the articles are transported by the conveyor 112, each may be scanned by scanner S. Based on a characteristic of the articles (e.g., those identified as a group intended for a particular customer, which may be determined by the scanner S but not necessarily so), the conveyors 114, 118 work together to convey the articles to any one of two or more of the stations 116a, 116b, 116c (which may be considered as bagging stations or platforms for supporting the articles for purposes of being collected for removal from the store, and may include a receptacle G for bags, sacks, or like carriers (such as boxes)), with the path of travel indicated by arrow A or arrow B in FIG. 1.

Each of the stations 116a, 116b, 116c may also be associated with a takeaway conveyor 120, such as one including an endless belt, for conveying the articles from the associated conveyor 112 or 114 to a remote, stationary location (such as along an upstanding stop or wall), which helps to avoid logjams. The conveyors 120 may be slightly tilted or declined in order to use gravity in assisting in conveying the articles along or to the respective stations 116a . . . 116n (which are preferably waist height for the average user in order to facilitate ease of bagging). In the case of station 116a, it can be understood from FIG. 1 that the associated conveyor 120 may have a raised proximal end associated with conveyor 114 in the extended condition (compare FIGS. 1 and 2, the latter having conveyor 114' in the extended condition such that articles are conveyed by this conveyor to station 116a and not diverted).

When the articles for a particular or first customer have been scanned to one station 116a, 116b, the bagging or packaging of the articles may be completed. At the same time, the scanner S may be used to scan articles for a different, second customer, which may be conveyed using conveyor 114 in a retracted condition to different location, such as second station 116b via now exposed conveyor 118 if the delivery to station 116a or 116c preceded it. In other words, a first group of articles is conveyed to one bagging station during a first period of time, and a second group of articles is delivered to a second bagging station at a second, later period of time. Once the articles for the second customer have been scanned to the station 116b, the process may repeat, with a third customer's articles being scanned to station 116a (or possibly to a third station 116c).

The selective conveying caused by the conveyor 114 may be automated or manual. For instance, the conveyor 114 may be activated to extend after detecting the presence of a carrier or cart, and then reactivated upon detecting the absence of a carrier or cart (or possibly deactivated or moved to a retracted condition upon a different cart being detected). A scannable partition may also be placed on the conveyor 112 to indicate that articles that follow belong to a particular group and should be delivered to a particular destination. The conveyor 114 may alternatively be actuated by the person scanning the articles using the scanner S, which of course may be the customer in a "self-checkout" type of arrangement, or the worker. The point is that the scanning may be done substantially continuously while the articles are diverted to different destinations for collection and, ultimately, disposition by sale.

The system may also be used to divert different articles to different destinations, such as stations 116a, 116b, based on a known characteristic of the article learned from scanning. For instance, when articles are scanned that are known to be delicate or difficult to divert (e.g., eggs, flowers, packs or gum, or other small items), these may be allowed to continue linearly along conveyors 112, 114 (which may include a chute or like passive transfer) to the station 116a, thereby ensuring safe handling. Articles without such limitations can then be diverted, such as using conveyor 114, to the alternate destination, station 116b. As collection by bagging, boxing, or the like, occurs at two separate destinations, special care may be used for the delicate articles, while the process may proceed at twice the speed. It is also contemplated that this type of arrangement could be used during particularly busy times simply to expedite the checkout process.

Thus, using this system 100, one or more first articles (such as for a first consumer or having a first characteristic) may be distributed to station 116a with transpositor conveyor 114 in the extended condition. When delivery of one or more second articles is desired, the conveyor 114 may be retracted, and the conveyor 118 used to divert the second article(s) to a second destination, such as station 116b. Likewise, one or more third articles may be delivered to a third destination, such as station 116c, using the selective actuation of conveyor 118 (that is, by driving it in the opposite direction). Consequently, multiple transactions may occur simultaneously, with the articles continuously being conveyed to the various destinations, or the articles may be transmitted to the destinations based on their characteristics.

While manual scanning is contemplated, it is also possible to use an automated scanner S. For example, a scanner that scans the articles not only for identifying indicia, such as a code, but also that examines the article to ensure that the code matches the article, may be used. Such a scanner is distributed by Datalogic ADC, Inc. of Eugene, Oreg., and described in International Patent Application PCT/US12/022438 (the disclosure of which is incorporated herein by reference). A manual scanner (not shown) may also be provided for use in connection with any articles not recognized by the automated scanner S.

Delivery of the articles to the alternate destinations, such as stations 116a, 116b, may also be enhanced by selective actuation of the first, extendable or transpositor conveyor 114. For example, the conveyor 114 may be actuated to extend the bed less than the full extension amount in order to deposit a first article at a first location on conveyor 118, and then actuated a different amount to deposit a second article at a second location. This way, the articles may be delivered to their end destinations in a more orderly and less congested manner.

Likewise, the conveyor 114 may be extended and retracted quickly in order to ensure that a relatively light article (e.g., a pack of gum) is dropped onto conveyor 118 in the intended manner. For a heavier article, such as a bag of sugar, slated for one of the alternate destinations, the transpositor conveyor 114 might not actuate at all, simply relying on gravity to deposit the article on the takeaway conveyor 118. The same may be true for articles that are delicate or susceptible to damage, if jarred. The control for the transpositor conveyor 114 may be done by way of a controller, such as controller R, that, in association with scanner S, has knowledge of the characteristics of the article being conveyed.

It may also be possible to provide a display D for each bagging station 116a . . . 116n. The display D may be used to display an indication of a particular customer's order at the bagging station, such as by a name, number, color, symbol or like identifier. Each display D may also include a tally or list of the articles being delivered to the association bagging station. In the FIG. 1 embodiment of the system 100, each display D is positioned above the corresponding bagging station 116a . . . 116n, but could be positioned at other locations as long as it is viewable by the associated customer. A display D associated with conveyor 112 may also be provided to assign a particular identification to an order that is then replicated on one or more of the displays D at the bagging stations.

Figure 6:
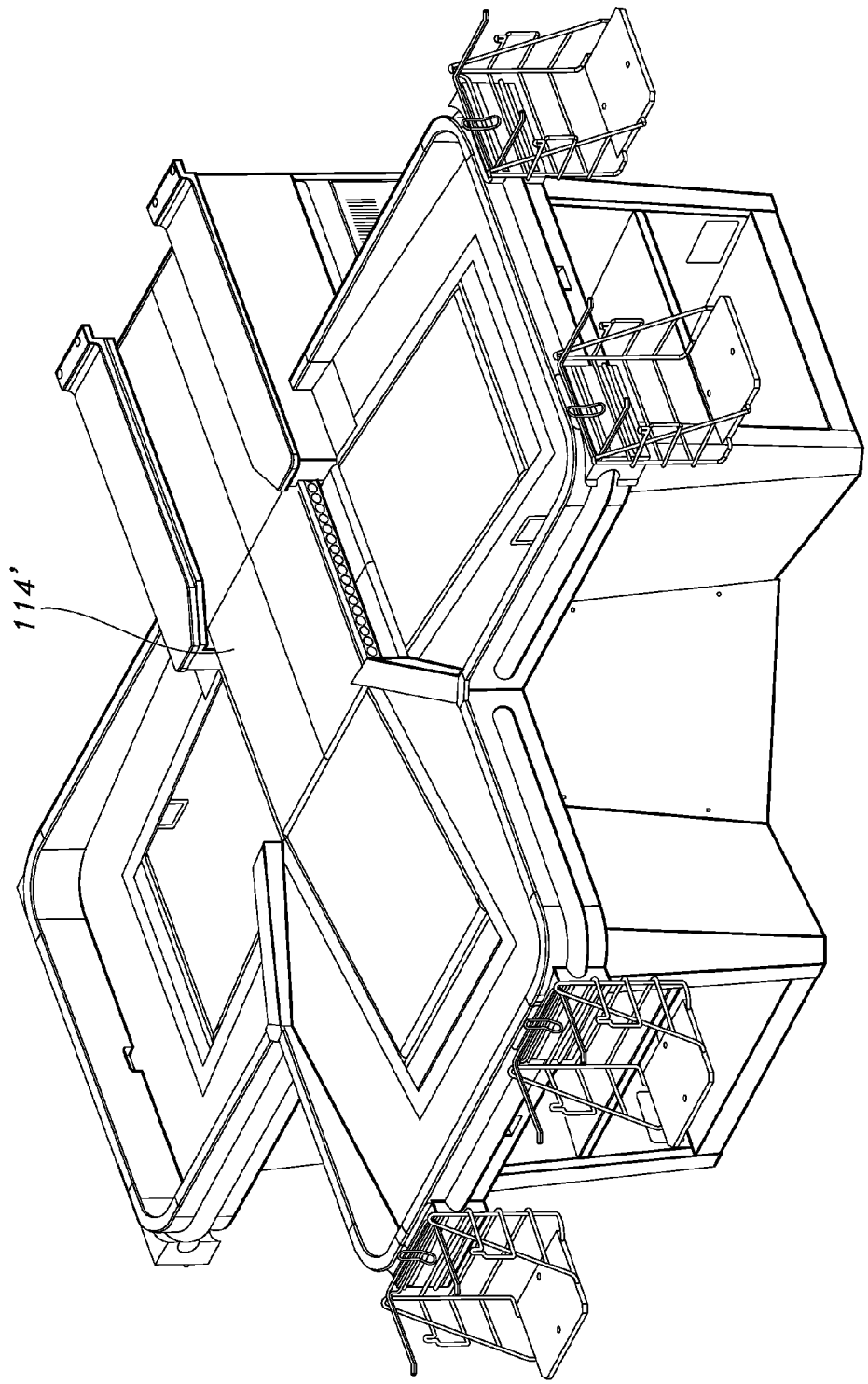
Figure 7:
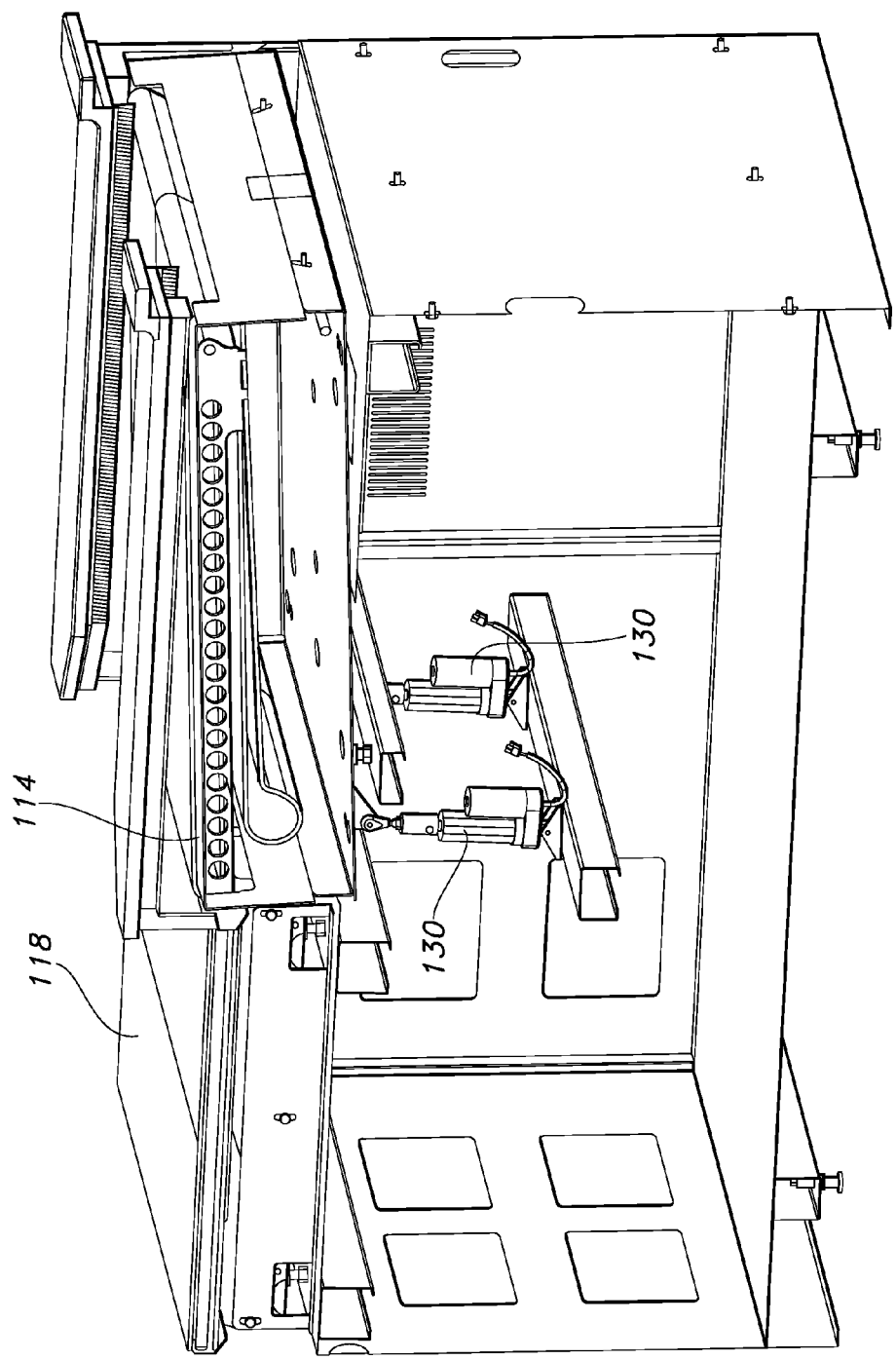
FIG. 7 is a side perspective view of the portion of the system shown in FIGS. 3 and 4.

Turning to FIGS. 4-7, it is also possible to configure the system 100 to help ensure that articles do not topple when transferring from conveyor 114 to conveyor 118. In the illustrated embodiment, this may be achieved by lowering end of the first conveyor 114 adjacent conveyor 118 when in the retracted condition so that one end of the first conveying surface of the first conveyor is substantially aligned with a horizontal plane corresponding to the second conveying surface of the second conveyor (FIGS. 4 and 5), such as the first conveyor is essentially slightly tilted. This ensures that a smooth transition is made by articles at the transfer point. When conveying articles with the extended bed is desired, it is simply raised and extended, as shown in FIG. 6, which may be achieved using one or more linear actuators 130 (see FIG. 7). An alternative is to raise the conveyor 118 in the vertical direction such that its surface is substantially aligned or flush with the surface of the conveyor 114 (see FIG. 8 and note arrow V), which conveyor 118 may then be lowered in order to allow conveyor 118 to extend or retract if desired. Still a further alternative is to raise and lower both conveyors 114, 118, respectively.

As can be further appreciated, additional capacity may be added by simply providing a further conveyor (not shown) in lieu of bagging station 116a, which would then deliver the articles to downstream conveyors for selective delivery to additional locations. For example, a transpositor conveyor in the place of station 116a could selectively deliver the articles either downstream, or to additional bagging stations, such as through the use of another bidirectional conveyor. The ability to extend the system 100 in this manner by repeating the arrangement is of course theoretically limitless.

Other configurations of checkout systems are possible using the foregoing concepts. For example, as illustrated schematically in FIG. 8, different bagging stations 116a, 116b may be provided on the same side of the system 100, in which case the conveyors 114, 118 would be replicated for each bagging station (e.g., conveyors 114a, 114b; 118a, 118b, with for example conveyor 114a delivering articles to conveyor 114b in the extended condition, but delivering articles to conveyor 118a in the retracted condition) and need only convey articles thereto. As can be appreciated, this arrangement could also be mirrored (such as by providing two such systems "back to back" running in parallel).

Figure 9:
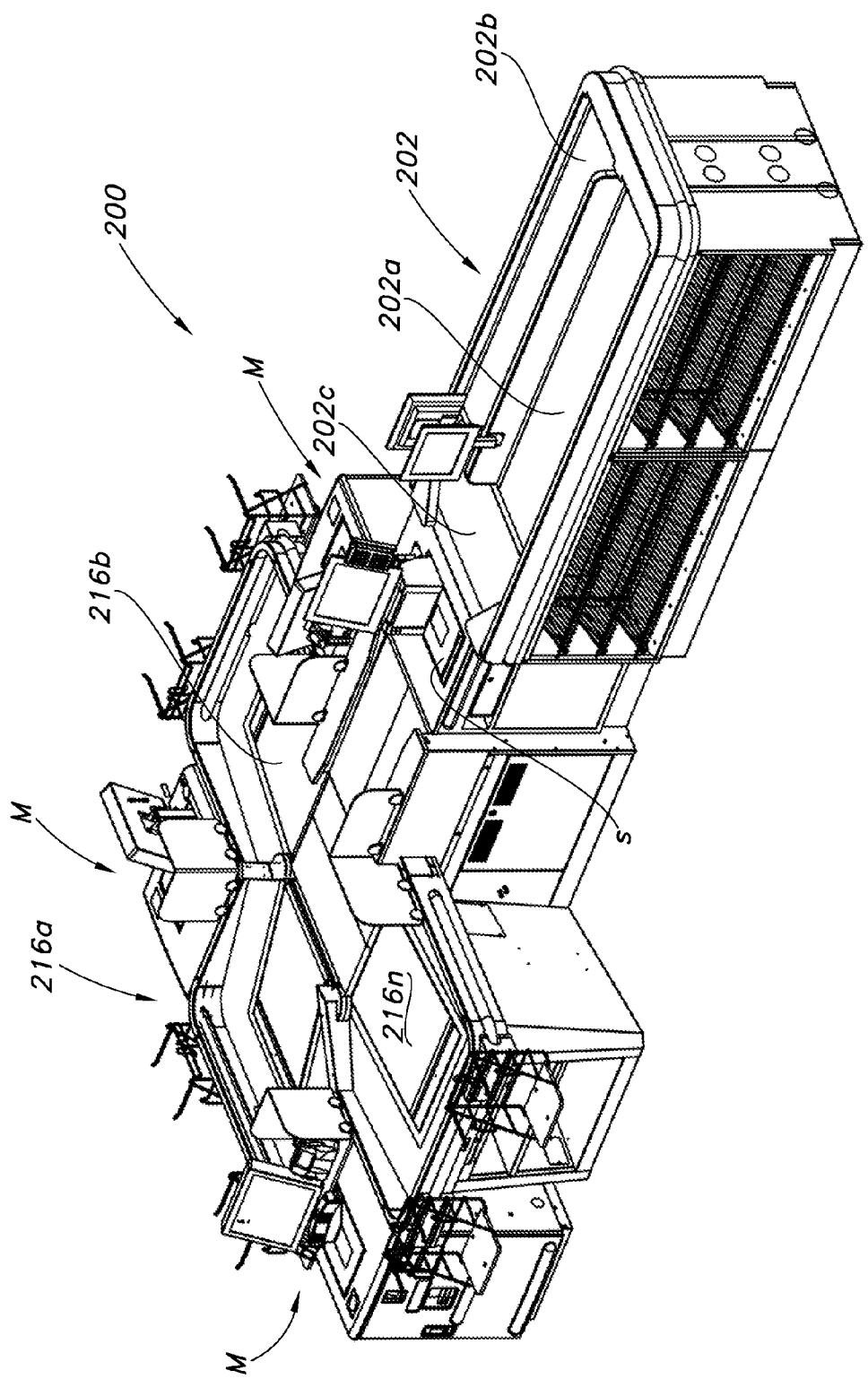
FIG. 9 is a schematic view showing yet another possible embodiment of the system.

FIG. 9 illustrates a further embodiment of a checkout system 200 which incorporates the similar arrangement of conveyors downstream of the scanning location as system 100, but upstream includes a divided infeed arrangement 202 with multiple conveyors 202a, 202b. These conveyors 202a, 202b which may operate in parallel, but independent, and thus may serially or sequentially convey associated articles. A common conveyor 202c may also be provided for delivering the articles from conveyors 202a, 202b to the scanner S.

The scanner S in this embodiment may be automatic, but is shown as being a manual arrangement, which would be operated by an operator (not shown) who would deliver the scanned items to the transpositor 214 for sortation among the bagging stations 216a . . . 216n. The operator may also by using a divider determine which conveyor 202a, 202b delivers articles to the scanner S, such as via common conveyor 202c.

As can be appreciated, the advantage of this arrangement is that multiple customers may unload their items onto conveyors 202a, 202b from each lateral side of infeed conveyor 200, concurrently or simultaneously. The operator may select the items from either location for scanning and delivery for downstream sortation (based on the particular group, customer, order or a characteristic of the item, as noted above). This provides for an enhanced level of continuous operation that is simply not possible using existing single lane checkout systems, since multiple customers may be unloading their wares while other customers orders are being bagged at separate locations, all in a single checkout system 200.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the invention should be considered in terms of claims that may be presented, and is understood not to be limited to the details of structure and operation shown and described in the specification and drawings.

The invention claimed is:

1. A checkout system for articles offered for sale at a store and for facilitating the bagging of the articles for removal from the store by a customer, comprising:
   first and second bagging stations adapted for supporting the articles for bagging;
   a first conveyor having an extended condition for conveying the articles for delivery to the first bagging station and a retracted condition;
   a second conveyor for conveying articles received from the first conveyor in the retracted condition for delivery to the second bagging station;
   a scanner for scanning the articles; and
   a controller adapted for controlling the first conveyor to move to the retracted condition or the extended condition in order to selectively deliver articles to the first bagging station or the second bagging station.

2. The checkout system of claim 1, wherein the second conveyor lies below the first conveyor in the extended condition.

3. The checkout system of claim 1, wherein the second conveyor is adapted to convey articles in a first direction for delivery to the second bagging station or in a second direction for delivery to a third bagging station.

4. The checkout system of claim 1, wherein the controller is adapted to cause the first conveyor to convey a first group or series of scanned articles for delivery to the first bagging station and a second group or series of scanned articles for delivery to the second bagging station.

5. The checkout system of claim 4, wherein the controller is adapted to cause the second conveyor to convey a third series or group of scanned articles for delivery to a third bagging station.

6. The checkout system of claim 1, further including a third conveyor adapted to convey articles for delivery to a third bagging station, the third bagging station and the first bagging station being located on a common side of the checkout system.

7. The checkout system of claim 1, further including a receptacle associated with each bagging station.

8. The checkout system of claim 1, further including a payment station for receiving payment for articles conveyed by the first conveyor.

9. The checkout system of claim 1, wherein one of the first or second conveyors is adapted for being raised and lowered to transfer the articles from one of the first or second conveyors to the other in a smooth, uninterrupted manner.

10. The checkout system of claim 1, further including a display associated with each bagging station.

11. The checkout system of claim 1, further including a divided infeed conveyor for sequentially conveying a first article for a first customer to the scanner and a second article for a second customer to the scanner.

12. A method of checking out of a store at a checkout location, comprising:

conveying at least one first article selected for purchase at the checkout location on a first conveyor in an extended condition for delivery to a first bagging station; and conveying at least one second article selected for purchase at the checkout location from the first conveyor for delivery to a second bagging station using a second conveyor, with the first conveyor in a retracted condition.

13. The method of claim 12, further including the step of conveying at least one third article for delivery to a third bagging station using the second conveyor.

14. The method of claim 12, wherein the step of conveying the at least one first article comprises conveying a first group of articles, including the at least one first article, to the first bagging station, and wherein the step of conveying the at least one second article comprises conveying a second group of articles, including the at least one second article, to the second bagging station.

15. The method of claim 14, further including transacting with one or more customers to purchase the first group of articles, the second group of articles or both the first and second groups of articles.

16. The method of claim 14, wherein the step of conveying the first group is completed before the step of delivering the second group.

17. The method of claim 14, wherein the method comprises conveying one article from the first group, then one article from the second group, then another article from the first group.

18. The method of claim 12, wherein the step of conveying the at least one first article comprises conveying a first series of articles placed on the first conveyor during a first period to the first bagging station, and wherein the step of conveying the at least one second article comprises conveying a second series of articles placed on the first conveyor during a second period to the second bagging station.

19. The method of claim 12, further including the step of placing the articles into one or more receptacles at the first bagging station and the second bagging station.

20. The method of claim 12, further including the step of providing a divided infeed conveyor adapted for serially conveying a first article for a first customer to the scanner and a second article for a second customer to the scanner.

21. A checkout system for articles offered for sale at a store and for facilitating the bagging of the articles for removal from the store by a customer, comprising:
a first extendable conveyor having a retracted condition and an extended condition for conveying articles to a first area;
a second conveyor for conveying articles from the first extendable conveyor in the retracted condition to at least a second area; and
a payment station adapted for receiving payment for at least some of the articles.

22. The checkout system of claim 21, wherein the payment station is at the first area or the second area, and further including a bagging station at each of the first and second areas.

23. The checkout system of claim 21, wherein the payment station is located upstream of the first conveyor.

24. The checkout system of claim 21, further including a divided infeed conveyor adapted for serially conveying a first article for a first customer to a scanner upstream of the first conveyor and a second article for a second customer to the scanner.

25. The checkout system of claim 24, wherein the scanner comprises a manual scanner.

26. A method for facilitating the checking out of a store by a customer, comprising:
providing a first group or series of articles on a first transpositor conveyor for delivery to a first area;
providing a second group or series of articles on the first transpositor conveyor for delivery to a second area using a second conveyor; and
providing a device for the purchase of at least some of the articles by the customer adjacent to the first or second area.

27. A checkout system for articles offered for sale at a store and for facilitating the bagging of the articles for removal from the store by a customer, comprising:
first and second bagging stations adapted for supporting the articles for bagging;
a first conveyor for conveying articles on a first conveying surface for delivery to the first bagging station, the first conveyor having an extended condition for conveying the articles for delivery to the first bagging station and a retracted condition;
a second conveyor for conveying articles from the first conveyor for delivery to the second bagging station in the retracted condition, the second conveyor having a second conveying surface substantially aligned with a corresponding end of the first conveying surface of the first conveyor in the retracted condition;
a scanner for scanning the articles; and
a controller for controlling the first conveyor to selectively divert articles to the first and second bagging stations.

28. The checkout system of claim 27, wherein a first end of the first conveyor adjacent to the second conveyor is adapted for being raised and lowered in the retracted condition.

29. The checkout system of claim 27, wherein the second conveyor is adapted for being raised and lowered to substantially align the first and second conveying surfaces.

30. The checkout system of claim 27, wherein the first conveyor comprises an extendable bed adapted to extend over the second conveyor and deliver the articles to a third bagging station.

31. A checkout system for articles offered for sale at a store and for facilitating the bagging of the articles for removal from the store by a customer, comprising:
first and second bagging stations adapted for supporting the articles for bagging;
a first conveyor extending in a first direction for conveying the articles;
a second conveyor extending in a second direction for conveying the articles from the first conveyor to either the first bagging station or the second bagging station;
a scanner for scanning the articles; and
a controller for controlling the second conveyor to selectively divert one or more of the articles between the first and second bagging stations;
wherein the first conveyor includes a first conveying surface, an extended condition and a retracted condition, and the second conveyor includes a second conveying surface substantially aligned with the first conveying surface of the first conveyor in the retracted condition of the first conveyor.

32. A tiltable conveyor system, comprising:
a first conveyor for conveying articles on a first conveying surface, the first conveyor having an extended condition and a retracted condition;
a second conveyor for conveying articles received from the first conveyor in the retracted condition, the second conveyor having a second conveying surface substantially aligned with a corresponding end of the first conveying surface of the first conveyor in the retracted condition;

an actuator for raising or lowering at least the corresponding end of the first conveyor relative to the second conveyor.

33. A checkout system for articles offered for sale at a store and for facilitating the purchase of the articles by a plurality of customers, comprising:

a scanner for scanning the articles;

a divided infeed conveyor adapted for successively conveying at least a first article of a first customer to the scanner and at least a second article of a second customer to the scanner;

a first conveyor having an extended condition for conveying the articles for delivery to a first bagging station and a retracted condition;

a second conveyor for conveying articles received from the first conveyor in the retracted condition for delivery to a second bagging station; and a controller adapted for controlling the first conveyor to move to the retracted condition or the extended condition in order to selectively deliver articles to the first bagging station or the second bagging station.

34. The system of claim 33, wherein the divided infeed conveyor comprises a first infeed conveyor for conveying the first article and a second infeed conveyor for conveying the second article.

* * * * *